United States Patent
Krolak et al.

(10) Patent No.: US 9,564,845 B2
(45) Date of Patent: Feb. 7, 2017

(54) SYSTEM AND METHOD FOR GENERATOR MAIN FIELD ENERGY EXTRACTION

(71) Applicant: The Boeing Company, Chicago, IL (US)

(72) Inventors: Matthew J. Krolak, Renton, WA (US); Lijun Gao, Renton, WA (US); Shengyi Liu, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 98 days.

(21) Appl. No.: 14/542,875

(22) Filed: Nov. 17, 2014

(65) Prior Publication Data

US 2016/0141988 A1 May 19, 2016

(51) Int. Cl.
*H02P 9/10* (2006.01)

(52) U.S. Cl.
CPC ........... *H02P 9/107* (2013.01); *H02P 29/0241* (2016.02)

(58) Field of Classification Search
CPC .............................. H02P 9/107; H02P 29/0241
USPC ... 322/68, 59, 91, 44, 28; 318/716, 720, 250
See application file for complete search history.

(56) References Cited

U.S. PATENT DOCUMENTS

| | | | | |
|---|---|---|---|---|
| 6,924,629 B1* | 8/2005 | Mueller | .................. | H02J 7/245 322/28 |
| 7,106,030 B2* | 9/2006 | Isurin | ..................... | H02P 9/305 322/28 |
| 7,977,910 B2* | 7/2011 | Osman | ..................... | H02P 1/50 318/268 |
| 8,198,871 B2* | 6/2012 | Wild | ......................... | H02P 9/10 322/44 |
| 2006/0181251 A1* | 8/2006 | Velhner | .................. | F02N 11/04 322/59 |
| 2006/0290324 A1* | 12/2006 | Jabaji | ........................ | H02P 9/30 322/28 |
| 2008/0238373 A1* | 10/2008 | Eldery | .................. | H02H 7/067 322/28 |
| 2010/0007312 A1* | 1/2010 | Petkov | ..................... | H02P 9/02 322/44 |
| 2010/0007313 A1* | 1/2010 | Jakeman | .................. | H02P 9/10 322/86 |
| 2010/0079117 A1* | 4/2010 | Bekiarov | .............. | H02J 7/1438 322/28 |
| 2010/0134074 A1* | 6/2010 | Crane | .................... | H02K 19/26 322/79 |
| 2012/0153904 A1* | 6/2012 | Albsmeier | ................ | H02P 9/04 322/28 |

(Continued)

FOREIGN PATENT DOCUMENTS

FI    WO 2013079761 A1 * 6/2013 ............. H02P 9/302

*Primary Examiner* — Viet Nguyen

(57) ABSTRACT

A system and method for controlling the main field current in an electrical generator is disclosed. The system can include a controller to sense the voltages and currents in the system to identify load faults. The system can also comprise one or more switches and an energy dissipator to absorb, store, or dissipate the main field current in the event of a load fault, such as a short circuit. In the event of a load fault, the controller can change the position of the one or more switches to redirect the main field current from the main field windings of the rotor to the energy dissipator. The energy dissipator can absorb or store the main field current significantly reducing the time required to stop the output current of the generator.

17 Claims, 10 Drawing Sheets

(56) References Cited

U.S. PATENT DOCUMENTS

| | | | |
|---|---|---|---|
| 2013/0193903 A1* | 8/2013 | Illiano | H02P 9/123 |
| | | | 318/716 |
| 2014/0266079 A1* | 9/2014 | Rozman | H02P 9/02 |
| | | | 322/28 |
| 2014/0266080 A1* | 9/2014 | Silander | H02P 9/302 |
| | | | 322/59 |

* cited by examiner

SYSTEM AND METHOD FOR GENERATOR MAIN FIELD ENERGY EXTRACTION

BACKGROUND

1. Field of the Disclosure

Embodiments of the present disclosure relate generally to electrical generators, and more specifically to a system and method for extracting the main field energy from a generator to accelerate generator shutdown.

2. Background of Related Art

Generators are used to generate a majority of the power on current electric power grids. These generators, which can be alternators or permanent magnet generators, for example, are used to turn mechanical energy from internal combustion, wind, nuclear, and hydraulic sources, for example, into electrical energy. Modern generators can produce hundreds of megawatts each.

Modern wound rotor generators include a rotor and a stator, each with one or more electrical windings. A magnetic field on the spinning rotor, generated by a current passing through the rotor winding, induces an electrical current in the windings of the stator creating AC electricity. The output voltage of the generator is often controlled by varying the current flowing through the rotor winding and therefore the strength of the magnetic field which induces voltage on the stator windings. The current in the rotor winding may be supplied by direct electrical connection to the generator controller by, for example, slip rings, or may be transferred from the generator controller through an armature winding to the rotor through electromagnetic induction. One or more loads can be connected to, and powered by, the output of the stator. In some embodiments, the output of the stator can be rectified to produce DC current.

A problem occurs, however, when a fault, such as a short-circuit, occurs on the load side and the energy delivered into the fault must be limited. In this condition, the generator controller can turn off the exciter current, but the rotor magnetic field does not immediately fall to zero due to the stored magnetic energy and the relatively long L/R time constant.

This condition results in the field current "free-wheeling" through the components of the rotor which, in turn, causes the main armature to continue producing current. Unfortunately, this current is being provided to a short-circuit, compounding the problem. This makes it difficult to clear the fault with the load (i.e., because it is still energized) and can overheat both the rotor and the stator. If this condition persists long enough, there is a risk of fire and permanent damage can occur to the load, the distribution system, and the generator.

What is needed, therefore, is a generator that includes a system and method to quickly dissipate the main field of a generator upon shutdown. It is to such a system and method that embodiments of the present disclosure are primarily directed.

SUMMARY

It should be appreciated that this Summary is provided to introduce a selection of concepts in a simplified form that are further described below in the Detailed Description. This Summary is not intended to be used to limit the scope of the claimed subject matter.

Embodiments of the present disclosure can include a system and method for quickly removing the energy from the main field of a generator. The system can shut down the main field in the event of a short-circuit, for example, and can prevent damage to the generator and the load, among other things.

Embodiments of the present disclosure can include a system for regulating a main field current in an electrical generator. In some embodiments, the system can include a controller connected to a main field circuit of the electrical generator to a voltage in the system and to switch one or more switches, an energy dissipator, with a first end and a second end, to dissipate energy from the system, a first switch connected to a first leg of the main field circuit and the first end of the energy dissipator, and a second switch connected to a second leg of the main field circuit and the second end of the energy dissipator. In this configuration, when the first switch is on and the second switch is off, the main field is connected to the main field winding of the electrical generator for normal operating conditions. In the event of a load fault, on the other hand, the first switch is in the off position and the second switch is in the on position to direct the main field current to the energy dissipator.

Embodiments of the present invention can also comprise a method of controlling a main field current in an electrical generator. In some embodiments, the method can include sensing one or more voltages in the electrical generator with a controller, switching one or more switches to connect a main field circuit to a main field winding to provide an electrical output to a load with the electrical generator, sensing a load fault on the load connected to the electrical generator with the controller, and switching the main field current from the main field circuit to a dissipator circuit to stop the electrical output.

Embodiments of the present disclosure can also comprise a system for regulating a main field current in an electrical generator. The system can comprise a controller connected in parallel to a main field circuit of the electrical generator to monitor a voltage, a current, or both of the electrical generator and a first switch, with a first position and a second position, connected in series with the main field circuit. In this configuration, when the voltage, current, or both of the electrical generator are nominal the first switch is placed in an on position. When the voltage, current, or both of the electrical generator are not nominal, on the other hand, the first switch is placed in a partially on position to dissipate energy from the main field circuit.

The features, functions, and advantages that have been discussed can be achieved independently in various embodiments of the present disclosure or may be combined in yet other embodiments, further details of which can be seen with reference to the following description and drawings.

Figure 1:
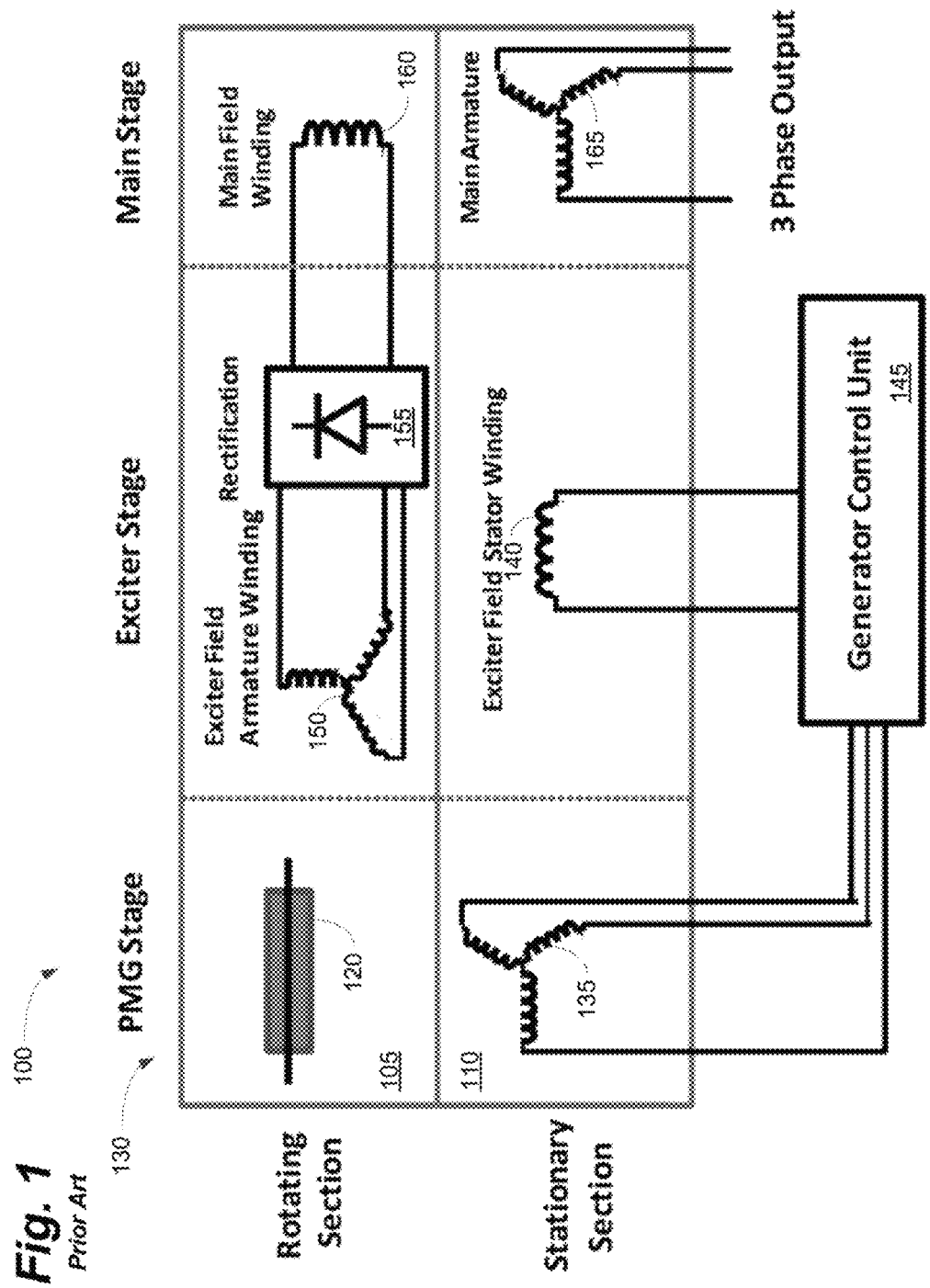
FIG. 1 is a block diagram depicting a conventional three-stage generator.

Each figure shown in this disclosure shows a variation of an aspect of the embodiment presented, and only differences will be discussed in detail.

DETAILED DESCRIPTION

Embodiments of the present disclosure relate generally to electrical generators, and more particularly to a system and method dissipating main field current in a generator connected to a load with a fault. In some embodiments, the system can comprise one or more switches, one or more logic gates, a controller, and an energy dissipator (e.g., a resistor or capacitor) to form a main field circuit and an energy dissipation circuit. During a load fault, the system can automatically reroute the main field current through the dissipator to significantly reduce the time constant of the main field current, thus protecting the generator components and enabling the fault to be cleared.

To simplify and clarify explanation, the disclosure is described herein as system for shutting down an electrical generator due to an electrical fault. One skilled in the art will recognize, however, that the disclosure is not so limited. The system can be used, for example and not limitation, with other types electrical components, where dissipation of a current is desirable, or simply to shut a generator off more quickly when it is no longer needed (a "shutdown"). The system is described below as using a dissipating resistor, however, one of skill in the art will recognize that other energy dissipating and/or absorbing components, such as a capacitor or a battery, could be used without deviating from the spirit of the disclosure.

The materials and components described hereinafter as making up the various elements of the present disclosure are intended to be illustrative and not restrictive. Many suitable materials and components that would perform the same or a similar function as the materials and components described herein are intended to be embraced within the scope of the disclosure. Such other materials and components not described herein can include, but are not limited to, materials and components that are developed after the time of the development of the disclosure.

As discussed above, one problem with conventional generators is that they do not provide the ability to remove the main field energy from the generator in the event of a malfunction. To this end, embodiments of the present disclosure can comprise a device, system, and method for extracting the generator field energy under a load fault condition is that it is entirely autonomous and completely independent from any external control circuits. This greatly simplifies the design and reduces wiring complexity, increasing reliability. In some embodiments, the entire system can be installed and contained on, or within, the rotor. The system can operate using only two voltage levels: (1) normal operate voltage and (2) other. In other words, if the system is operating at anything other than normal operating voltage (or a normal range of voltages), the main field energy can be extracted to enable fault correction.

FIG. 1 is a schematic representation of a conventional three stage synchronous generator 100. As with all generators, the system 100 comprises a rotation section 105 or rotor and a stationary section 110, or stator 110. The permanent magnet stage (PMG stage) 130 includes a permanent magnet 120, which is mounted on the rotor 105, while the main windings 135 are mounted on the stator 110. The rotor shaft 105 is connected to a mechanical power source (e.g., an internal combustion engine, not shown)

The exciter field stator winding 140 is on the stator 110 and is connected to a generator control unit 145, which regulates the exciter field current generated from the PMG stage 130. The exciter armature windings 150 (shown here with three phases) are located on the rotor 105. The output current from the exciter armature windings 150 are rectified by a three phase bridge rectifier 155 to produce DC current. The rectified (DC) current is then conducted to the main field windings 160.

Figure 2:
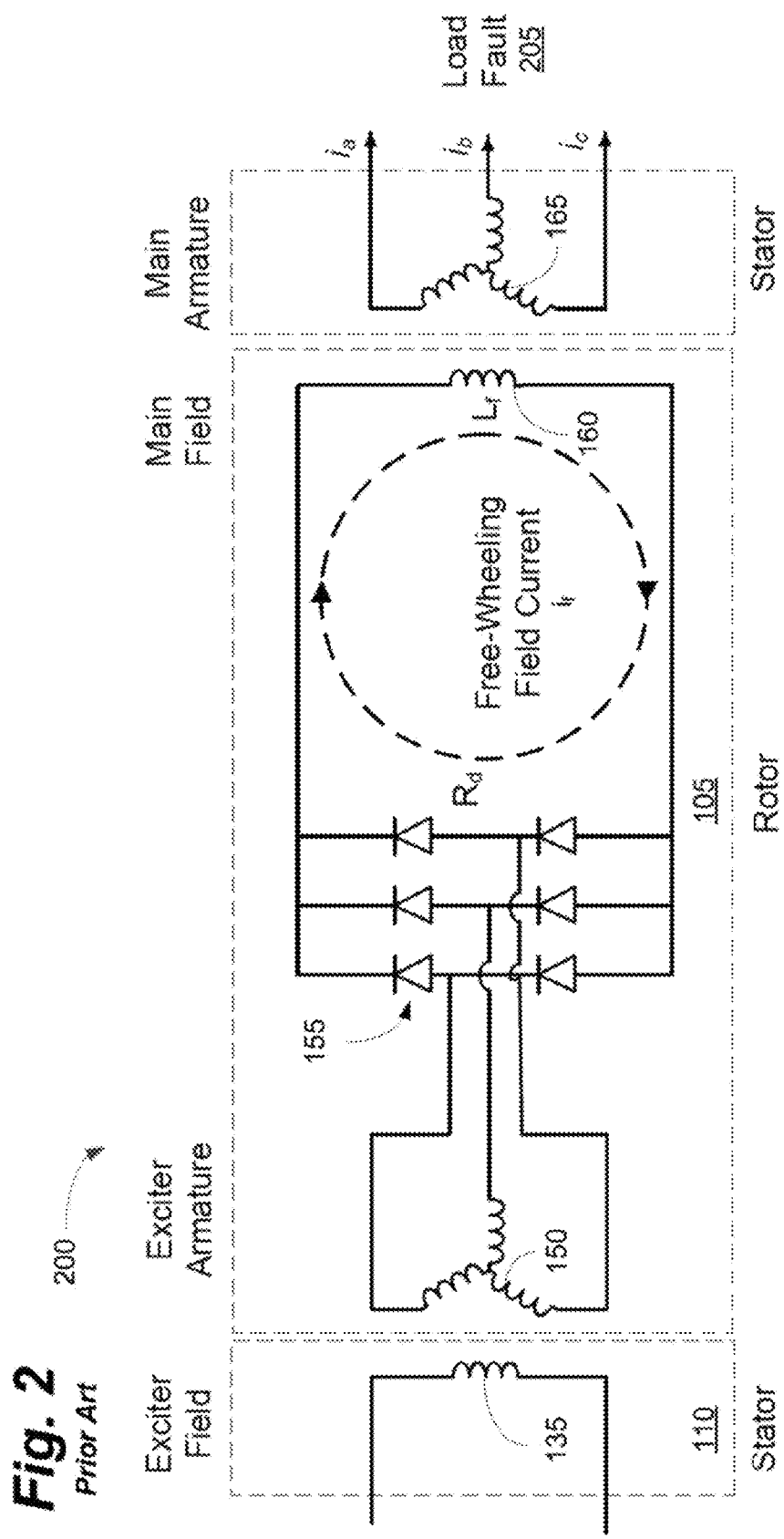
FIG. 2 is a circuit schematic depicting a conventional generator during a load fault condition.

The main stage 165 can include the main field windings 160, which are located on the rotor 105 and the main armature windings 165 (shown here with three phases) are on the stator. 110. The three-phase output from the main armature 165 is then connected to a distribution bus, fuse panel, or directly to loads. As shown in FIG. 2, the exciter can also comprise an exciter power supply 135a and an exciter driver 135b. The generator control unit 145 can vary the voltage and/or current to the exciter driver 135b to control the output voltage and current of the generator.

As also shown in FIG. 2, however, a problem with conventional generators arises when there is a problem, or load fault 205, with the load connected to the generator 200. A load fault 205 can be, for example, a partial or complete short circuit. As mentioned above, a load fault 205 can also comprise a request to shut down the generator 200 (e.g., for maintenance). In this scenario, the control unit 145 senses the fault, and shuts off the exciter field 150 current immediately. Unfortunately, a zero exciter field 150 current does not stop the main field current $i_f$ immediately because the established field energy does not disappear instantaneously. As a result, the field current $i_f$ continues to circulate through the diodes of the rectifier 155.

Because the diodes in the rectifier 155 have a relatively small resistance $R_d$, and dissipate relatively little power through their forward voltage drop, this simple RL circuit 210 has a large time constant, $L_f/R_d$, causing the main field current $i_f$ to have a large amplitude and long duration, delaying the shutdown of the generator 200. This results in the main armature windings 165 continuing to provide high current to a load fault, which makes it difficult to clear the fault. In addition, the high currents in the armature windings 165 can result in the overheating of the windings, the generator's wiring harness, and further damaging the load. This can delay or prevent the generator 200 from reentering service, destroy the generator 200 or wiring, and create a fire and/or smoke hazard.

Figure 3:
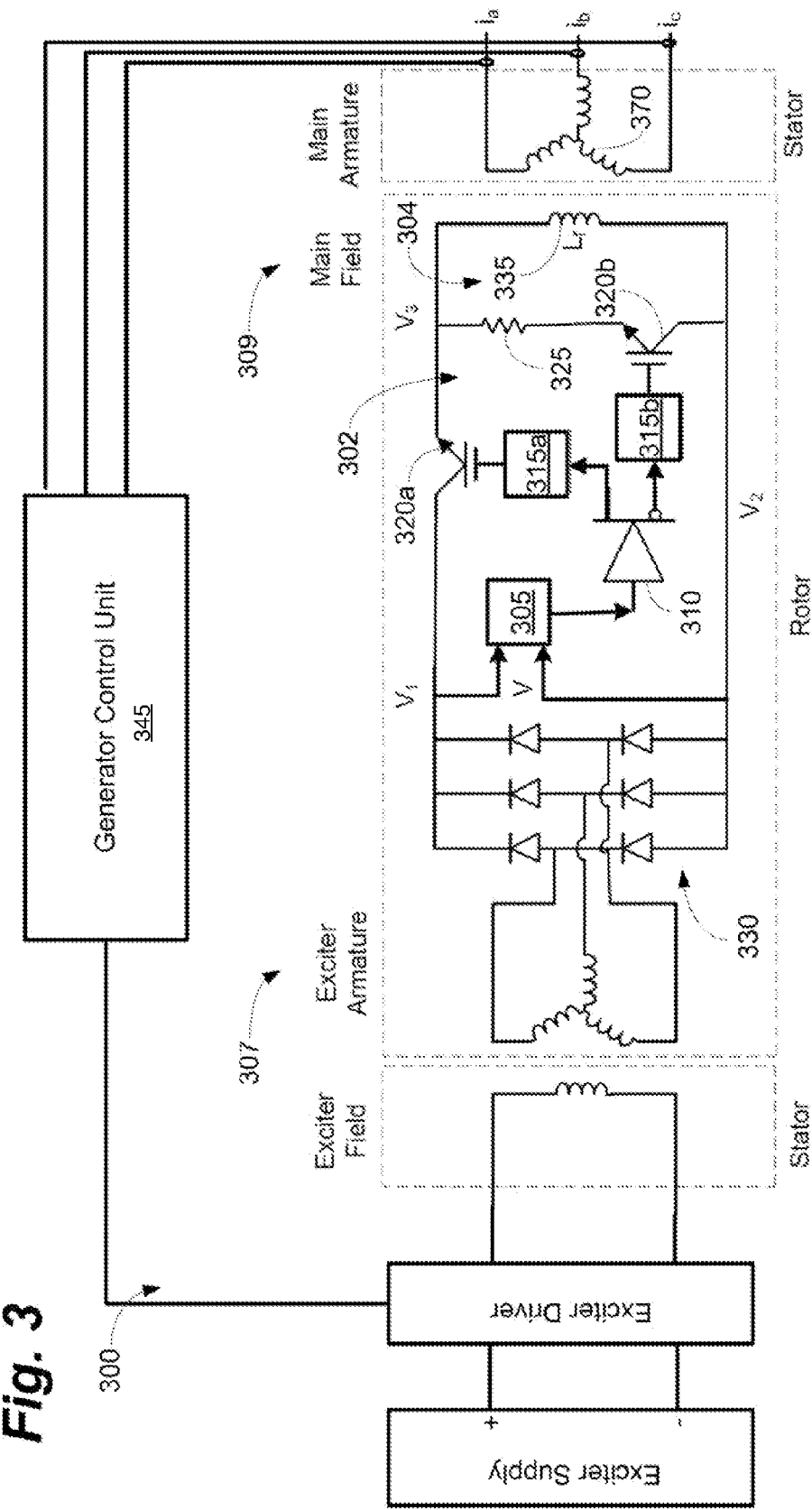
FIG. 3 is a circuit schematic depicting a generator with a first system to extract main field energy, in accordance with some embodiments of the present invention.

As shown in FIG. 3, to address this issue, embodiments of the present invention relate to a system and method for quickly dissipating the main field current $i_f$ in an electrical machine. FIG. 3 depicts the exciter stage 307 and the main stage 309, which are shown in a linear fashion, but does not include the PMG stage 130. As before, the output current and voltage can be controlled by a generator control unit 345. The system can further comprise a separate controller 305 and an energy dissipator circuit 302. The controller 305 can sense the system voltage and either (1) maintain normal operation or (2) remove the energy from the main field with the dissipator circuit 302. Because the additional components of the system 300 can be located entirely on the rotor 301, complexity and wiring is kept to a minimum.

In some embodiments, the system 300 can comprise the controller 305, a logic gate 310, one or more gate drivers 315a, 315b, one or more controllable switches 320a, 320b, and an energy dissipator 325. The system 300 can essentially comprise a main field circuit 302, including a first switch 320a and the main field windings 335; and the dissipator circuit 304, including the main field windings 335, a second switch 320b, and the energy dissipator 325. In normal operation, therefore, the main field circuit 302 can provide the main field current $i_f$ to the main field windings 335 to produce an output current. In a load fault situation, on the other hand, the main field current $i_f$ can be redirected to the dissipator circuit 304 to be absorbed, dissipated, or stored. Because there are only two basic conditions—i.e., nominal voltage (or range of voltage) and load fault—in some embodiments, the controller 305 can comprise a simple comparator to compare the output voltage to the nominal voltage.

The energy dissipator 325 is discussed below as a dissipating resistor 325. The dissipating resistor 325 can have a large resistance (R) in relation to the main field current ($R_d$) to significantly reduce the time constant of the system 300 when a load fault is detected. In a preferred embodiment, the dissipating resistor 325 can be mounted on the rotor shaft of the generator 300, or other similar component that has a large mass for heat dissipation. Of course, the energy dissipator 325 could also comprise electrical components other than a resistor that can absorb, store, and/or dissipate electrical energy, such as, for example and not limitation, a capacitor or battery.

In some embodiments, the switches 320 can be operated complementarily by complementary logic gate 310 outputs. The voltage signals of the field winding 335 can be sensed by the processor 305 to detect either (1) normal operation or (2) a load fault. In some embodiments, the overall system voltage, V, can also provide the power source to drive the switches and the controller 305. In other embodiments, these components can be provided with an external power source.

The controller 305 can comprise, for example and not limitation, a microprocessor, a DSP, an application specific integrated chip (ASIC), or field programmable gate array (FPGA). The switches 320 can be, for example and not limitation, insulated-gate bipolar transistors (IGBTs), Bipolar Junction Transistors (BJTs), or metal-oxide-semiconductor field-effect transistor (MOSFET). In some embodiments, particularly when high current levels are involved, the switches 320 can also comprise gate drivers 315 to increase switching speed and accuracy.

Figure 4:
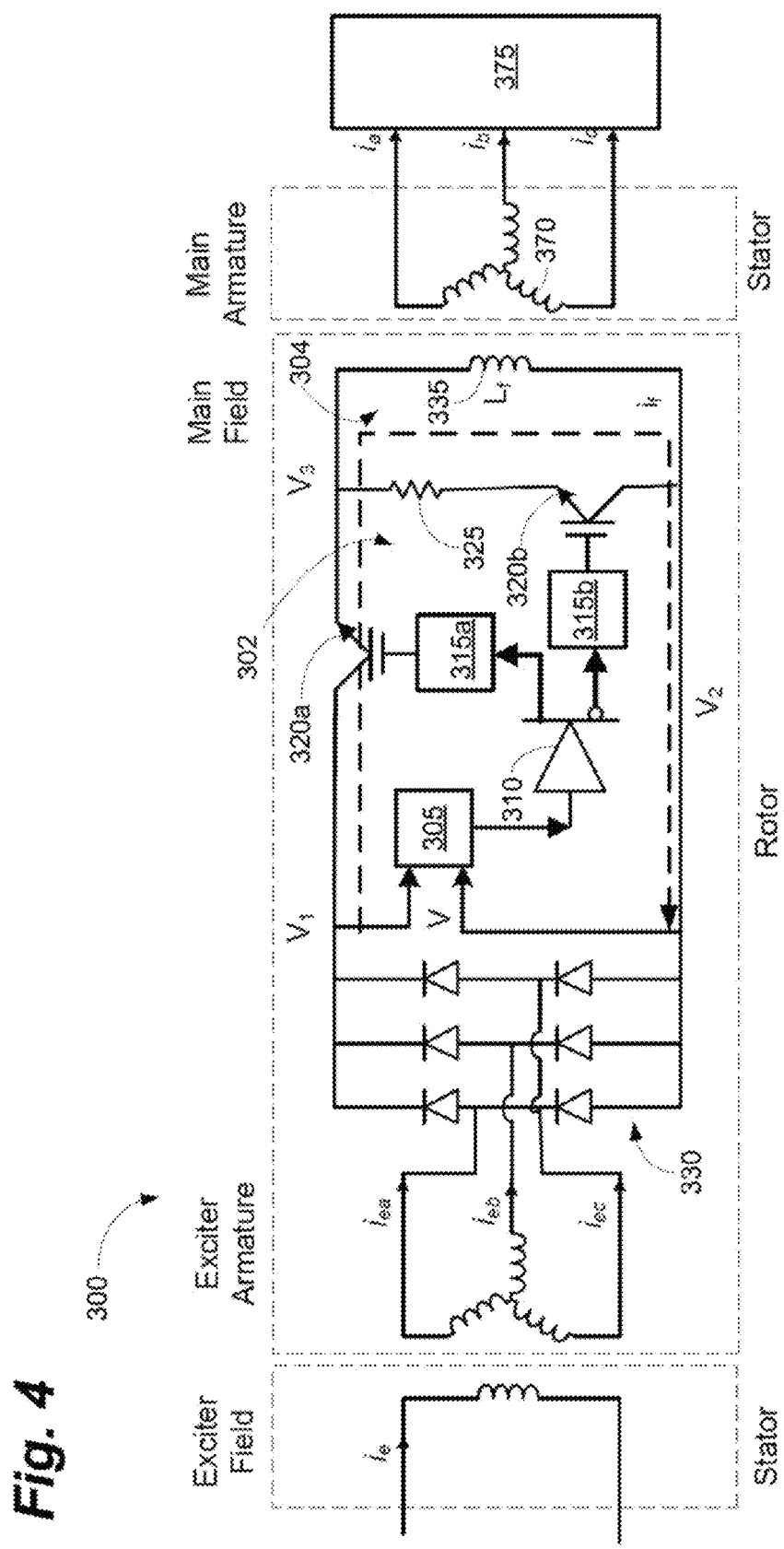
FIG. 4 is a circuit schematic depicting the generator of FIG. 3 under normal operation (i.e., with no load fault), in accordance with some embodiments of the present invention.

As shown in FIG. 4 (without the exciter field components 135 and generator controller 345), the field armature currents, $i_e$, are rectified by the rectifier 330 to produce a DC output. During normal operation, therefore, the system voltage V, is:

$$V=V_1-V_2 \quad (1)$$

and V>0 (i.e., the voltage is positive). In this configuration, $V_1-V_2>0$ and $V_1-V_3>0$. This results in the first switch 320a being in the "on" position energizing the main field circuit 302. Thus, the main field current $i_f$ is provided to the main field windings 335 and the main armature 370 outputs a three-phase AC current 375 to be distributed to a load or load bus.

Figure 5:
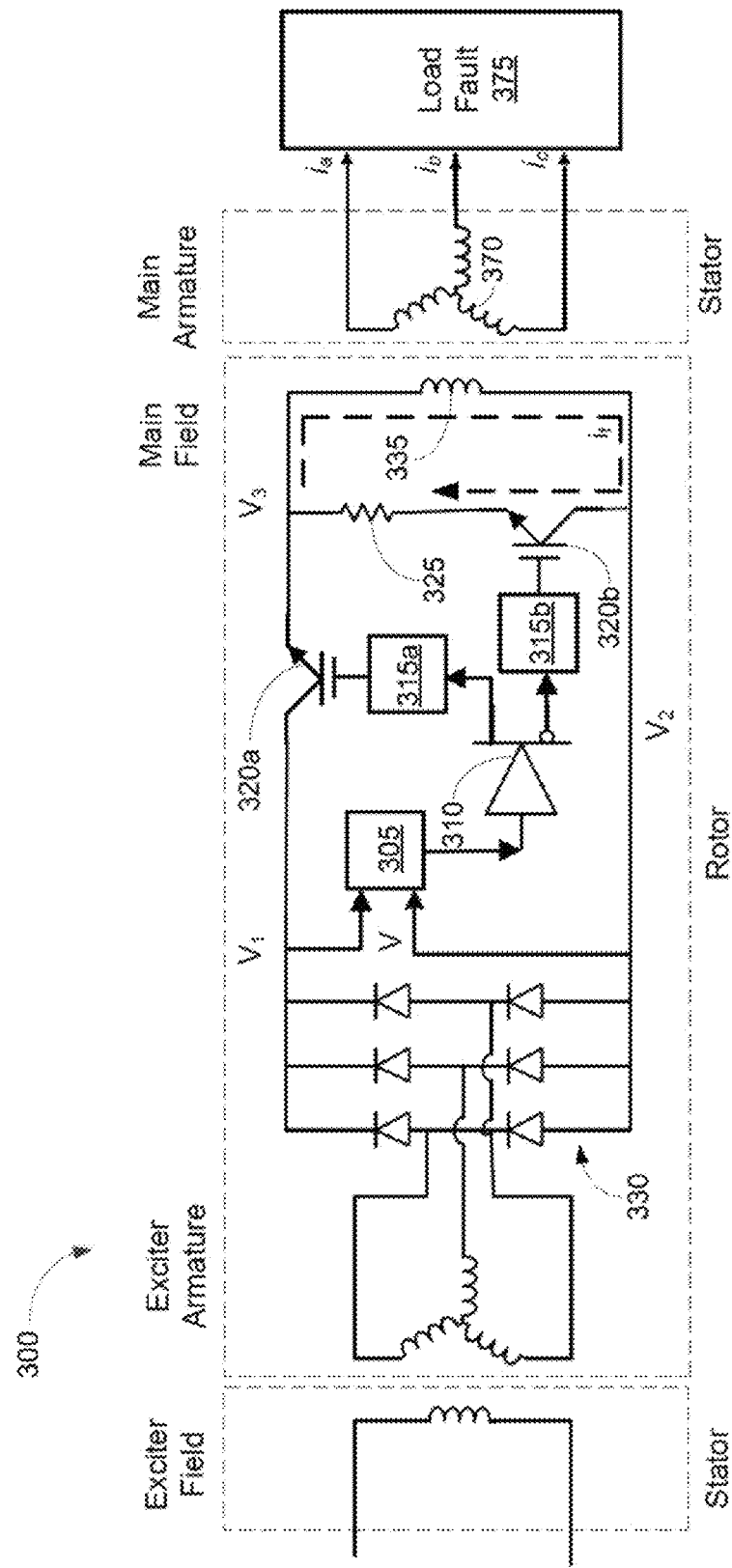
FIG. 5 is a circuit schematic depicting the generator of FIG. 3 with a load fault, in accordance with some embodiments of the present invention.

As shown in FIG. 5, however, when a load fault is detected, the system 300 senses the fault and immediately shuts off the exciter field current, $i_e$. Because the main field energy is established, however, the main field current $i_f$ continues to flow or "free-wheel" around the main field circuit 302. Without the voltage from the rectifier 330, the main field current $i_f$ begins to slowly decrease, but as long as the main field persists, the generator 300 continues to supply current to a known load fault. Fortunately, the decreasing main field current $i_f$ results in a polarity reversal across the main field winding 335. As a result, $V=V_1-V_2<0$ (i.e., the polarity has now reversed) and $V_2-V_3>0$. This switches the second switch 320b on, providing a path for the main field current $i_f$ through the dissipating resistor 325. The dissipating circuit 304 is further isolated because $V=V_1-V_2<0$, switching the first switch 320a off Because the resistance across the dissipating resistor 325 is significantly higher than the resistance of the main field windings 335 (i.e., R>>$R_d$), the time constant of the circuit for the main field current transient is significantly reduced (i.e., $L_f/R<<L_f/R_d$). As a result, the main field current $i_f$ persists for a much shorter time and at a much smaller amplitude. This, in turn, protects generator windings from overheating, disconnects the load more quickly, and reduces, or eliminates, the fault current so that the fault can be cleared more easily.

Figure 6:
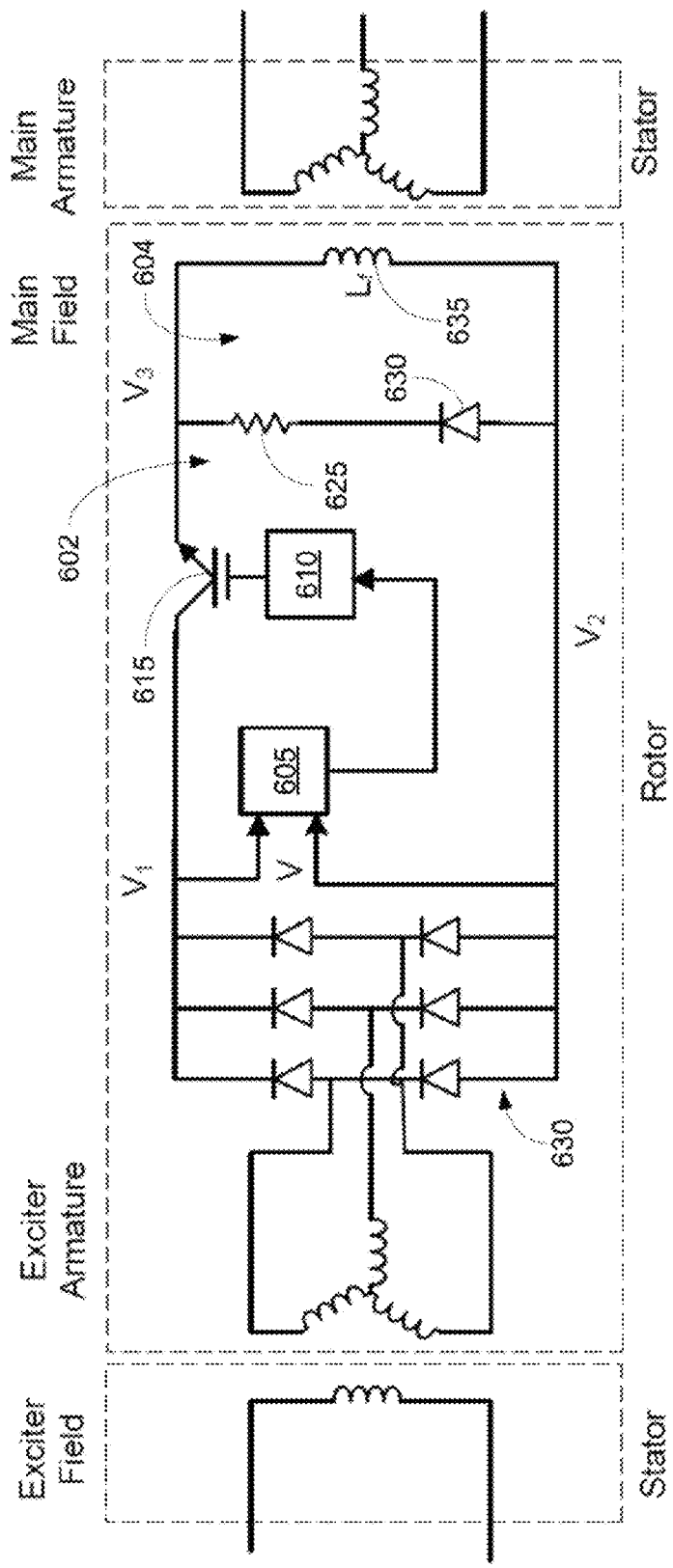
FIG. 6 is a circuit schematic depicting a generator with a second system to extract main field energy, in accordance with some embodiments of the present invention.

In other embodiments, as shown in FIG. 6, the system 600 can comprise a controller 605, a gate driver 610, a controllable switch 615, a dissipating resistor 625, and a diode 620. As before, the dissipating resistor 625 can have a large resistance (R) in relation to the main field current ($R_d$) to significantly reduce the time constant of the system 600 when necessary. The dissipating resistor 625 can be mounted on the rotor shaft, or other heat sink, which has a large mass or cooling for heat dissipation. The voltage signals of the rectifier 630 can be sensed by the controller 605 (or signal processing unit). In some embodiments, the voltage V can provide the power source to drive the switch 615; while in other embodiments, an external power source can be provided.

Figure 7:
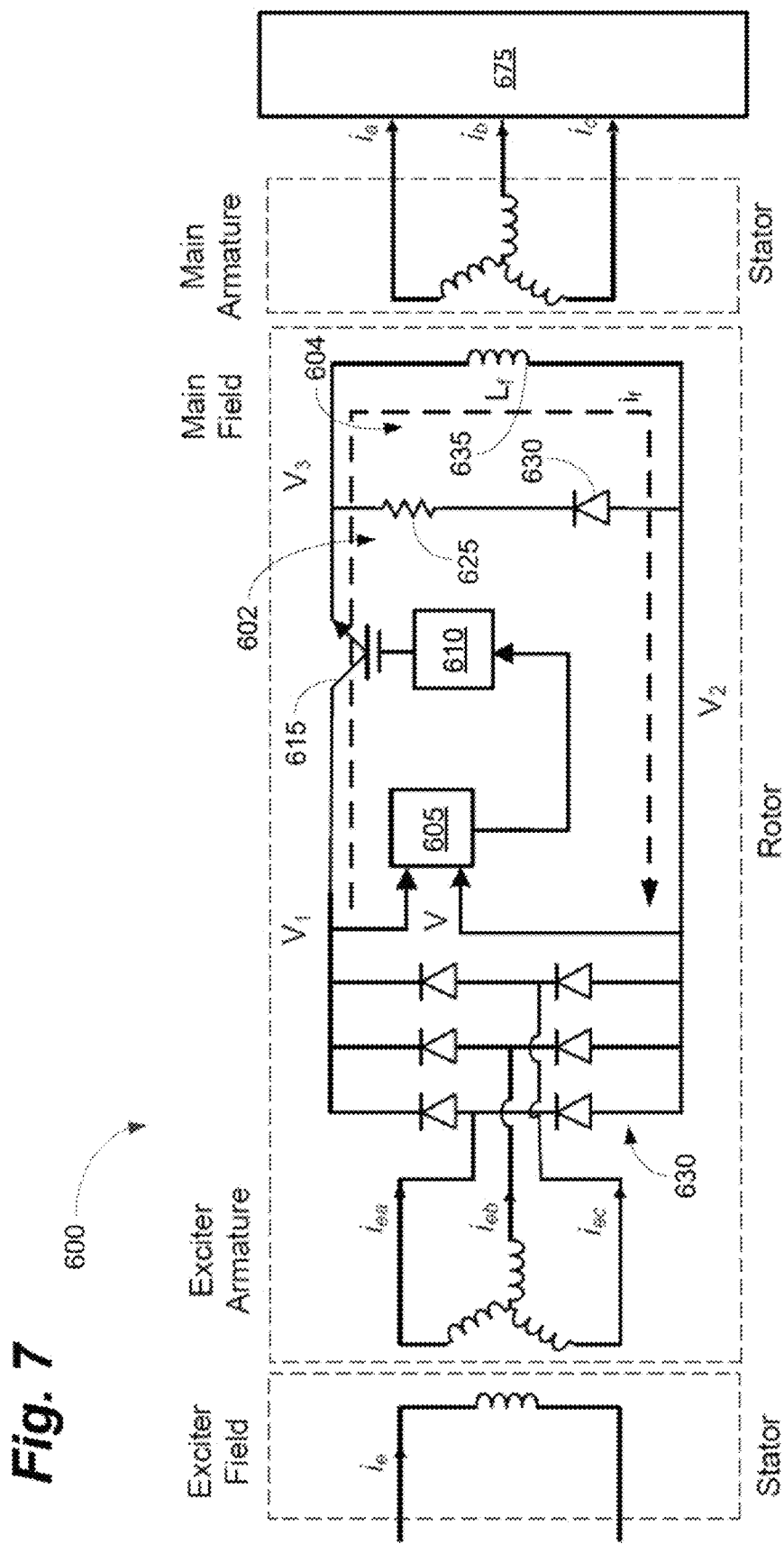
FIG. 7 is a circuit schematic depicting the generator of FIG. 6 under normal operation (i.e., with no load fault), in accordance with some embodiments of the present invention.

As shown in FIG. 7, under a normal operation conditions, the field armature current, $i_f$, is rectified by the rectifier 630, the system voltage V, is:

$$V=V_1-V_2 \quad (2)$$

and V>0 (i.e., the voltage is positive). Because $V_1-V_3>0$, the first switch 615 is on and provides the main field current $i_f$ to the main field windings 635 via the main field circuit 602. In addition, because since $V_3-V_2>0$, the diode 620 is reversely biased and is, therefore, off, bypassing the dissipator circuit 604. The main field current $i_f$ is provided to the main field windings 635 and three-phase main power 675 is generated and distributed to a load, load bus, etc.

Figure 8:
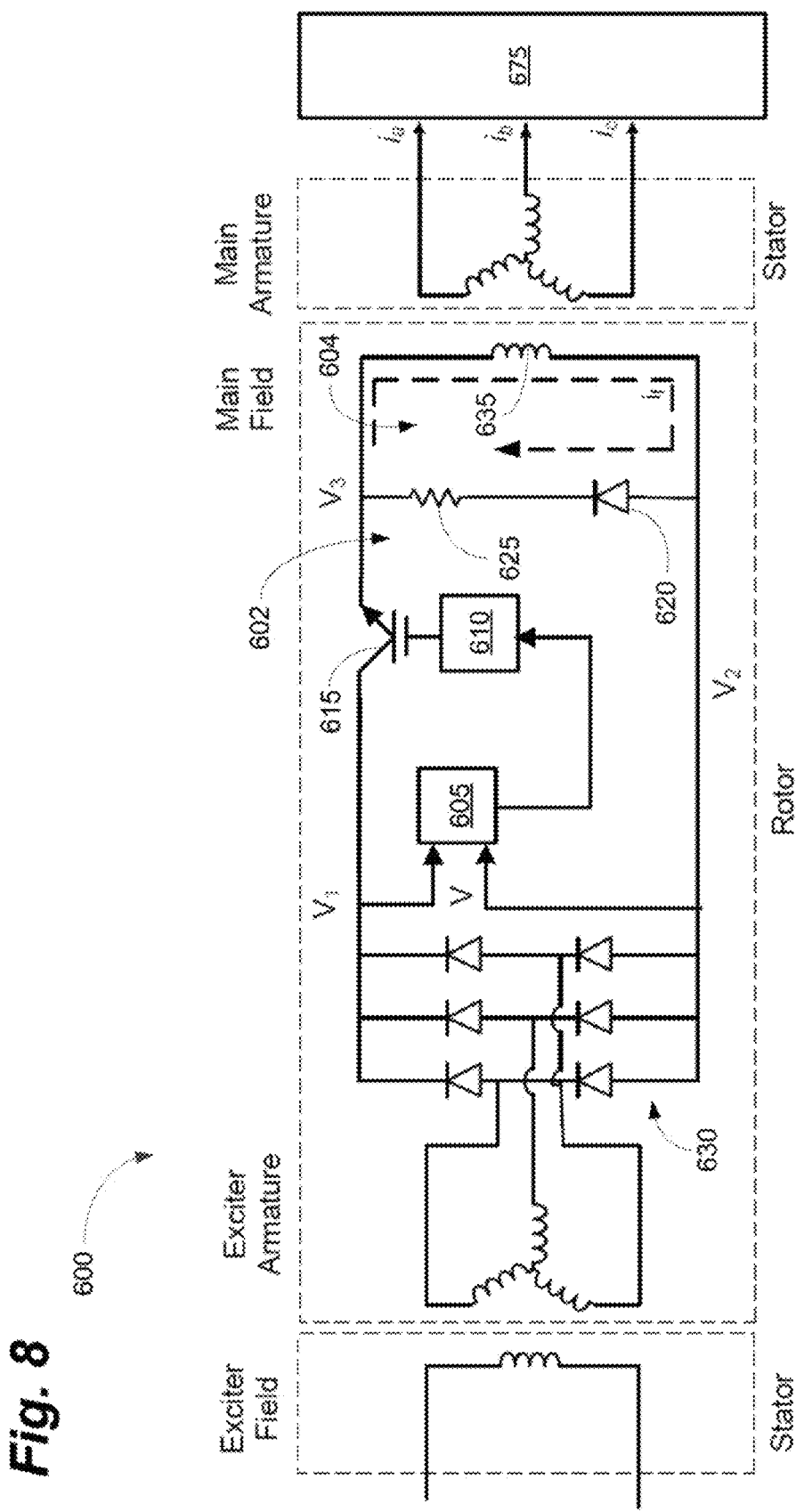
FIG. 8 is a circuit schematic depicting the generator of FIG. 6 with a load fault, in accordance with some embodiments of the present invention.

As shown in FIG. 8, however, under a load fault condition, the controller 605 senses the fault and immediately shuts off the exciter field current $i_e$. As before, however, because the main field energy is already established, the main field current $i_f$ continues to flow. The main field current $i_f$ tends to decrease as a result of a diminishing current from the rectifier 630, however, resulting in a voltage polarity reversal across the main field windings 635.

In this case, $V=V_1-V_2<0$ (i.e., the voltage is now negative) and $V_2-V_3>0$, so the diode 620 is now forward biased, or on. This routes the main field current $i_f$ through the dissipating circuit 604 and the dissipating resistor 625. In addition, the dissipating circuit 604 is further isolated, because the system voltage V is negative and the switch 615 is, therefore, off Because the resistance across the dissipating resistor 625 is significantly higher than the resistance of the main field windings 635 (i.e., R>>$R_d$), the time constant of the dissipation circuit 604 for the main field current transient is significantly reduced (i.e., $L_f/R<<L_f/R_d$). As a result, the main field current $i_f$ persists for a much shorter time and at a much smaller amplitude. This, in turn, can protect generator windings from overheating, disconnect the load more quickly, and reduce, or eliminate, the fault current so that the fault is easier to clear.

Figure 9:
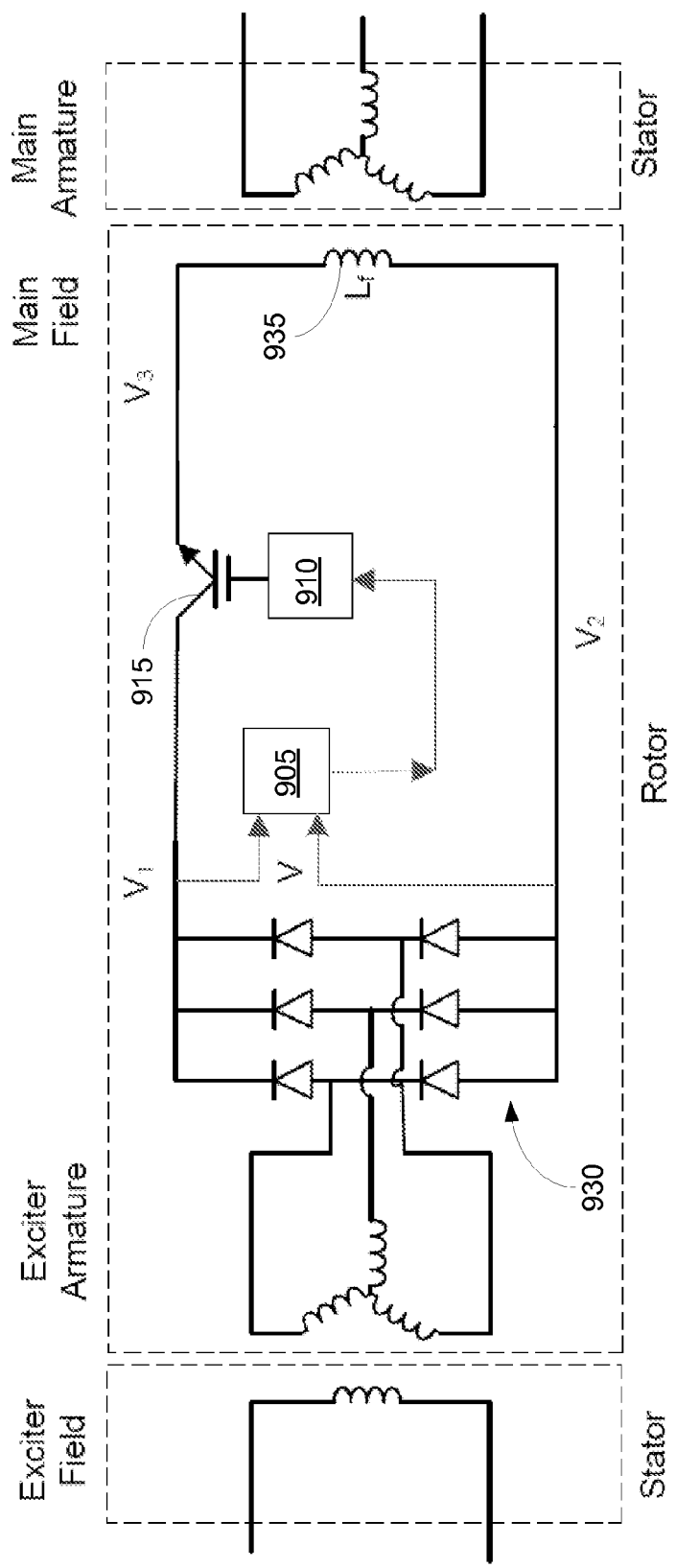
FIG. 9 is a circuit schematic depicting a generator with a third system to extract main field energy, in accordance with some embodiments of the present invention.

In still other embodiments, FIG. 9 shows a system 900 that can utilize a switch 915 as an energy dissipator. In this configuration, when the controller 905 detects a load fault, the switch 915 can be moved from the on position to the partially on position (i.e., in between on and off) or can be rapidly oscillated between the on position and the off position. In this manner, the resistance of the switch increases dissipating the main field energy. In some embodiments, such as when high voltages are involved, the system 900 can also comprise a gate driver 910 to increase the switching speed of the switch. In some embodiments, the gate driver 910 can move the switch 915 to a position between the on and off position or rapidly move the switch 915 between the on and off position to dissipate the main field energy.

In a preferred embodiment, regardless of the circuits used to dissipate or store the main field energy, the components of the system 300, 600, 900 can be mounted on the rotor 105 of the generator. In this manner, the wiring for the system 300, 600, 900 can be minimized, reducing the expense and maintenance of the system 300, 600, 900. In addition, as discussed above, the rotor 105 tends to be a fairly massive component enabling it to act as a heat sink for the system 300, 600, 900 components. In addition, because the system 300, 600, 900 is essentially binary in nature—i.e., the voltage is either nominal or not—it can be simple and robust, increasing reliability.

Figure 10:
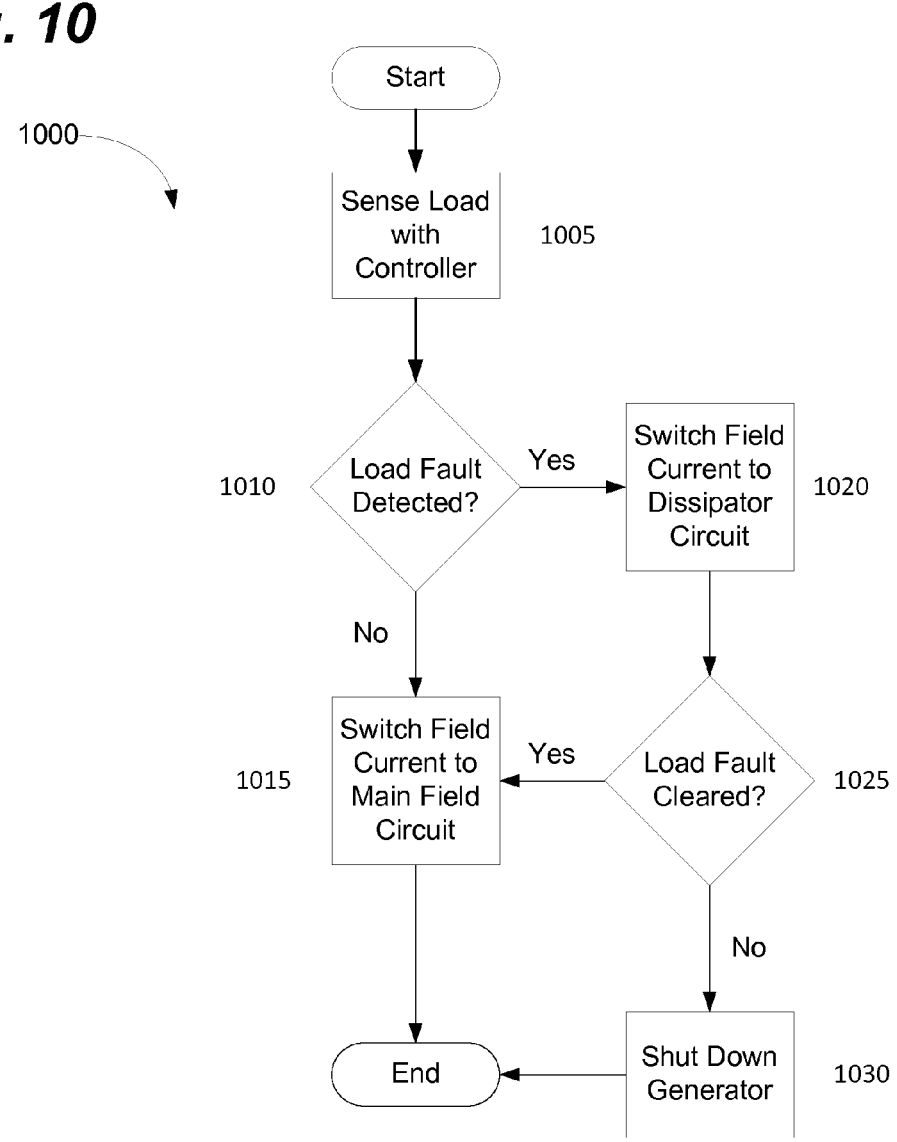
FIG. 10 is a flowchart depicting a method of dissipating the main field energy in a generator with a load fault, in accordance with some embodiments of the present invention.

Embodiments of the present disclosure can also comprise a method 1000 for controlling the main field current in an electrical generator. In some embodiments, FIG. 10 shows a method that can comprise providing a controller to sense 1005 one or more loads connected to the generator. If the controller does not detect 1010 a load fault, the field current can be switched 1015 to the main field circuit enabling the generator to output electricity to the load.

If, on the other hand, the controller detects 1010 a load fault, the controller can activate one or more switches, diodes, or both to switch 1020 the main filed current to a dissipator circuit to dissipate the energy in the main field circuit and shut down the generator. As discussed above, the dissipator circuit can comprise one or more resistors, capacitors, batteries, or other electrical energy absorbing devices. In some embodiments, the method 1000 can further comprise checking 1025 to detect of the load fault has been cleared. If the load fault has been cleared, the system can switch 1015 the field current back to the main field circuit to enable the generator to restart.

As discussed above, in some embodiments, the field current can be switched 1015 to the main field circuit and switched 1020 to the dissipator circuit in several ways. In some embodiments, the field current can be switched 1015 to the main field circuit by placing a first switch in the on position and a second switch in the off position; while the field current can be switched 1020 to the dissipator circuit by placing a first switch in the off position and a second switch in the on position. In other embodiments, the field current can be switched 1015 to the main field circuit by placing a first switch in the on position and a first diode in the off position; while the field current can be switched 1020 to the dissipator circuit by placing a first switch in the off position and the first diode in the on position. In some embodiments, such as when the fault cannot be cleared, the method 1000 can include shutting down 1030 the generator to enable the load to be repaired or disconnected.

While several possible embodiments are disclosed above, embodiments of the present disclosure are not so limited. For instance, while several possible circuits 300, 600, 900 have been disclosed, other suitable circuits could be selected without departing from the spirit of the disclosure. The dissipating resistor 325, 625, for example, could be replaced with a capacitor to store the excess energy of the main field until generator restart or a switch in the partially on position to dissipate the main field energy through resistance. The system is describe above for use when a generator is connected to a load that experiences a load fault, for example; but could be used simply to shut down the generator more efficiently in normal use (e.g., for maintenance or simply to take the generator off line). In addition, the location and configuration used for various features of embodiments of the present disclosure such as, for example, the location of the dissipating resistor 325, 625 can be varied according to a particular generator or installation that requires a slight variation due to, for example, the size or construction of the generator, the generator type, installation location, or maximum output. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed embodiments, therefore, are considered in all respects to be illustrative and not restrictive. The scope of the disclosure is indicated by the appended claims, rather than the foregoing description, and all changes that come within the meaning and range of equivalents thereof are intended to be embraced therein.

The invention claimed is:

1. A system for regulating a main field current in an electrical generator comprising:
    a controller, connected to a main field circuit of the electrical generator, to monitor a voltage in the system and to switch one or more switches;
    an energy dissipator, with a first end and a second end, to dissipate energy from the system;
    a main field winding, wherein a first end of the main field winding and the first end of the energy dissipator are directly coupled to a first leg of the main field circuit, wherein a second end of the main field winding is coupled to a second leg of the main field circuit;
    a first switch connected along the first leg of the main field circuit and to the first end of the energy dissipator; and
    a second switch, wherein a first end of the second switch is directly connected to the second leg of the main field circuit and a second end of the second switch is connected to the second end of the energy dissipator;

wherein the first switch is on and the second switch is off to provide the main field current to the main field winding of the electrical generator in a normal operating condition; and wherein the first switch is off and the second switch is on to direct the main field current to the energy dissipator in a load fault condition.

2. The system of claim 1, further comprising:
a first gate driver connected to the controller and the first switch to accelerate switching of the first switch; and
a second gate driver connected to the controller and the second switch to accelerate switching of the second switch.

3. The system of claim 1, further comprising:
a logic gate, with a first position and a second position, connected to the controller, the first switch, and the second switch;
wherein the first switch is on and the second switch is off in the first position; and
wherein the first switch is off and the second switch is on in the second position.

4. The system of claim 1, wherein the energy dissipator is a resistor.

5. The system of claim 4, wherein the resistor is disposed on a rotor of the electrical generator to enable the rotor to act as a heat sink.

6. The system of claim 1, wherein the controller, the energy dissipator, the first switch, and the second switch are disposed on a rotor of the electrical generator.

7. The system of claim 1, wherein the second switch is a diode.

8. A system for regulating a main field current in an electrical generator comprising:
a controller connected to a main field circuit of the electrical generator to monitor one or more voltages in the system;
a logic gate, connected to the controller, with a first position and a second position;
an energy dissipator, with a first end and a second end, to dissipate energy from the system;
a main field winding, wherein a first end of the main field winding and the first end of the energy dissipator are directly coupled to a first leg of the main field circuit, wherein a second end of the main field winding is coupled to a second leg of the main field circuit;
a first switch connected along the first leg of the main field circuit and to the first end of the energy dissipator; and
a second switch, wherein a first end of the second switch is directly connected to a second leg of the main field circuit and a second end of the second switch is connected to the second end of the energy dissipator;
a first gate driver connected to the first switch to increase a switching speed of the first switch; and
a second gate driver connected to the second switch to increase a switching speed of the second switch;
wherein the first switch is on and the second switch is off when the logic gate is in the first position to provide the main field current to the main field winding of the electrical generator in a normal operating condition; and wherein the first switch is off and the second switch is on when the logic gate is in the second position to direct the main field current to the energy dissipator in a load fault condition.

9. The system of claim 8, wherein the energy dissipator is a resistor.

10. The system of claim 8, wherein the energy dissipator is a capacitor.

11. A method of controlling a main field current in an electrical generator comprising:
sensing one or more voltages in the electrical generator with a controller;
providing a first switch connected along a first leg of a main field circuit and to an energy dissipator;
providing a second switch, wherein a first end of the second switch is directly connected to a second leg of the main field circuit and a second end of the second switch is connected to a first end of the energy dissipator;
turning the first switch on and the second switch off with the controller to connect the main field circuit to a main field winding to provide an electrical output to a load with the electrical generator, wherein a first end of the main field winding and a second end of the energy dissipator are directly coupled to the first leg of the main field circuit and a second end of the main field winding is coupled to the second leg of the main field circuit;
sensing a load fault on the load connected to the electrical generator with the controller; and
switching the main field current from the main field circuit to the energy dissipator to stop the electrical output by turning the first switch off and the second switch on with the controller.

12. The method of claim 11, wherein the load fault is a short-circuit.

13. The method of claim 11, further comprising:
providing a logic gate connected to the controller, the first switch and the second switch;
wherein the controller moves the logic gate between a first position and a second position;
wherein the first switch is on and the second switch is off in the first position; and
wherein the second switch is on and the first switch is off in the second position.

14. The method of Claim 11, wherein the second switch is a diode; and
wherein switching the main field current from the main field circuit to the energy dissipator comprises:
turning the first switch off with the controller; and turning the diode on with the controller.

15. The method of claim 11, further comprising:
switching the main field current with the at least one of the first and second switches from the energy dissipator to the main field circuit when the load fault is cleared.

16. The method of claim 11, further comprising:
providing one or more gate drivers to accelerate switching of the first and second switches.

17. The method of claim 11, wherein the load fault is a shutdown.

* * * * *